Dec. 25, 1962 L. W. KRAKE 3,070,255
RADIATOR FILLER NECK
Filed Sept. 16, 1960
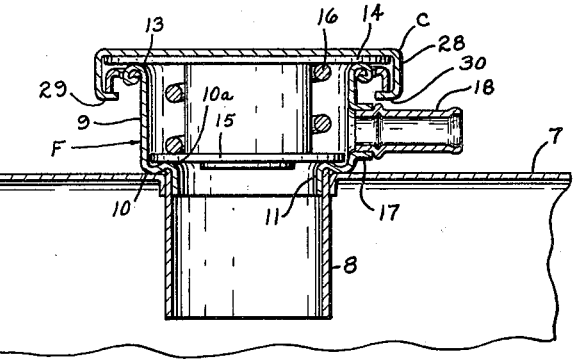
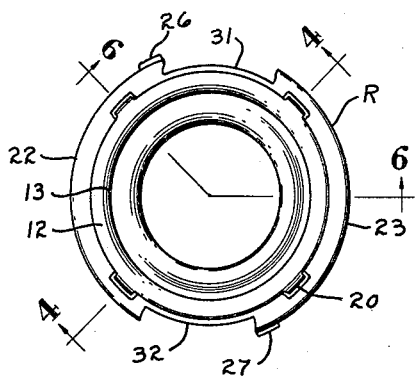 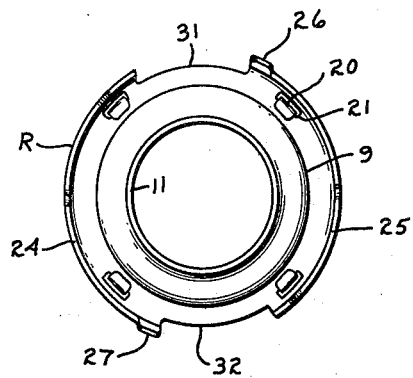
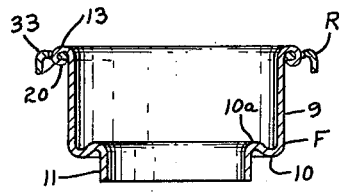 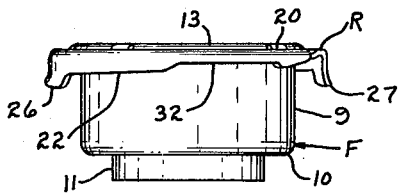
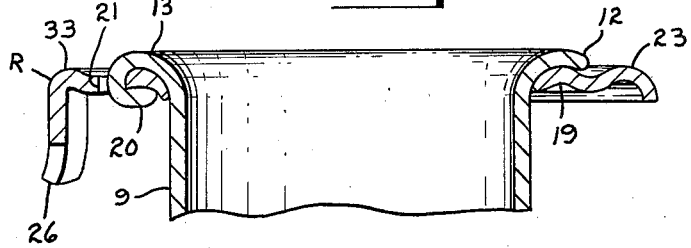
INVENTOR
Leland W. Krake
BY
H. F. Johnston
ATTORNEY

3,070,255
RADIATOR FILLER NECK
Leland W. Krake, Bethlehem, Conn., assignor to Scovill Manufacturing Company, Waterbury, Conn., a corporation of Connecticut
Filed Sept. 16, 1960, Ser. No. 56,512
1 Claim. (Cl. 220—40)

This invention is an improvement in filler necks, particularly intended for use with automobile radiators. There is a trend of late to make automobile radiators from aluminum material and it would be desirable also to make the filler neck attached to the top of the radiator of like material. This is especially so because if the filler neck were made of brass, as in the past, there would be not only the added cost of material, but the danger of electrolytic action between the brass and aluminum.

Other problems, however, are encountered when it is attempted to make a filler neck of aluminum. The cam sections on the filler neck which are designated to co-operate with cam lugs on the filler cap are required to have properties of greater strength and better wear-resistance than found in aluminum or aluminum alloys, especially when it is considered that the filler cap has steel lugs which ride under the cam surfaces of the filler neck.

An object of my invention, therefore, is to overcome all of these difficulties with a filler neck which is made principally of aluminum and with its cam sections of a much harder and more durable material, such as steel.

Another object is to avoid exposure of any steel portion to the contents of the radiator to reduce the likelihood of corrosion.

Other objects and advantages of my invention will hereinafter more fully appear.

In the accompanying drawing, I have shown for the purpose of illustration, one embodiment which the invention may assume in practice. In the drawing:

FIG. 1 is a vertical cross-section of my improved filler neck in association with the radiator and cap;

FIG. 2 is a top plan view of the filler neck;

FIG. 3 is a bottom plan view of the same;

FIG. 4 is a vertical cross-section of line 4—4 of FIG. 2;

FIG. 5 is a side view of the filler neck; and,

FIG. 6 is a cross-section on an enlarged scale on line 6—6 of FIG. 2.

In FIG. 1, there is indicated a radiator shell 7 having connected thereto a downwardly extending sleeve 8 into which my improved filler neck F is adapted to fit. The filler neck F has a cylindrical wall 9 of somewhat larger diameter than the sleeve 8. The bottom end of the wall 9 is joined to an inwardly formed flange 10 that is generally S-shaped in cross-section and provides an upwardly rounded valve seat 10a for reasons as will appear later. A circular flange 12 is formed outwardly from the wall 9 at its upper end and has a rounded upper surface 13 to provide a valve seat for the outer liner or gasket 14 of the radiator cap C.

The inner end of the radiator cap C is provided with an inner liner or a gasket 15 that is adapted to seal against the seat 10a of flange 10 when the cap C is in assembled position. This inner gasket 15 is usually backed up by a spring 16 to allow for the escape of pressure in case the radiator is overheated.

The wall 9 of the filler neck is provided with a suitable flanged opening 17 having a nipple 18 fitted therein and to which nipple a suitable overflow tube (not shown) may be connected.

In order to provide for the usual interlocking bayonet lock connection between the radiator cap C and filler neck F, a cam ring R is provided with an inner bearing portion 19 adapted to seat against the underside of the outward flange 12 and this bearing portion is preferably slightly arced upwardly in cross-section so as to snugly interfit within the inwardly curved underside area of the flange 12 in a manner as shown in FIG. 6.

The bearing portion 19 of the cam ring R is held in tight bearing engagement against the underside of the flange 12 by any suitable means, such as by four tabs 20 extending from the rim of the filler neck outer flange 12 and which project through suitable openings 21 in the cam ring and are clinched over the underside of such cam ring and thus provide the maximum resistance to endwise stresses between the cam ring and the main body of the filler neck.

The cam ring R is provided with opposed cam sections 22 and 23 extending outwardly from the inner bearing portion 19 and then downwardly to provide the desired inclined cam edges 24 and 25 respectively, and suitable stop lugs 26 and 27.

The radiator cap C has a depending flange 28 with inturned lugs 29 and 30 adapted to pass through cut-outs 31 and 32 in the cam ring R and to ride upon the inclined cam edges 24 and 25 of the cam sections 22 and 23 when the cap is tightened into place.

Since the circular bearing portion 19 of the cam ring is located a substantial distance below the rounded upper surface 13, and it is necessary to properly position the inclined cam edges 24 and 25 of the cam ring so as not to require any alteration of the standard dimensions of the radiator cap, the material of the cam ring is deflected somewhat upwardly as indicated at 33 and from this level the cam sections extend downwardly to the inclined edges 24 and 25.

When reference is made to the term "aluminum," it is meant to include all suitable alloys of aluminum or similar metal. This is the material of which the main or body portion of the filler neck is made. The cam ring is preferably made of steel and it will be noted that this steel ring does not come in contact with the liquid or vapor contents of the radiator because it is set well below the seat 13 of the filler neck against which the cap liner or gasket seals.

As a result of my invention, it will be evident that an improved filler neck has been provided which is altogether satisfactory for aluminum radiators, which is strong and durable and wherein no corrosion problems are encountered.

What I claim is:

A radiator filler neck comprising a body portion made of aluminum and having a cylindrical wall, means at its lower end for connection to a radiator, an out-turned flange at its upper end presenting a rounded upper surface to provide a seat for the inner liner of a radiator cap; a cam ring consisting of a metal heavier and stronger than aluminum and having an inner portion extending continuously around the cylindrical wall and bearing throughout its circumference against the underside of said out-turned flange, segmental cam sections integral with and extending downwardly from the outer circumference of said cam ring for engagement with complementary cam lugs of a closure cap, and a plurality of tabs projecting downwardly from said out-turned flange, said tabs extending through openings in the cam ring and clinched over against the undersurface of the inner portion of said cam ring as a means for securing the cam ring to the body portion of said filler neck.

References Cited in the file of this patent

UNITED STATES PATENTS

| | | |
|---|---|---|
| 1,515,560 | Elwell | Nov. 11, 1924 |
| 2,607,383 | Christophersen | Aug. 19, 1952 |
| 2,756,897 | Houghton | July 31, 1956 |
| 2,968,421 | Eshbaugh | Jan. 17, 1961 |